US006669826B1

(12) United States Patent
Milgate, Jr. et al.

(10) Patent No.: US 6,669,826 B1
(45) Date of Patent: Dec. 30, 2003

(54) COMPACT PROTON EXCHANGE MEMBRANE (PEM) ELECTROCHEMICAL CELL STACK

(75) Inventors: Robert W. Milgate, Jr., Gloucester, MA (US); Anthony B. LaConti, Lynnfield, MA (US)

(73) Assignee: Giner Electrochemical Systems, LLC, Newton, MA (US)

( * ) Notice: Subject to any disclaimer, the term of this patent is extended or adjusted under 35 U.S.C. 154(b) by 65 days.

(21) Appl. No.: 10/120,888

(22) Filed: Apr. 11, 2002

Related U.S. Application Data (60) Provisional application No. 60/283,237, filed on Apr. 11, 2001.

(51) Int. Cl.$^7$ ............................................. C25B 9/18
(52) U.S. Cl. ..................................................... 204/254
(58) Field of Search ............................ 204/254–256, 204/268, 253, 267, 269, 270

(56) References Cited

U.S. PATENT DOCUMENTS

| | | | | |
|---|---|---|---|---|
| 4,073,715 A | * | 2/1978 | DeNora et al. | 204/256 |
| 4,311,577 A | * | 1/1982 | Kircher | 204/255 |
| 6,040,072 A | * | 3/2000 | Murphy et al. | 429/12 |
| 6,576,362 B2 | * | 6/2003 | Hanlon | 429/34 |

* cited by examiner

*Primary Examiner*—Donald R. Valentine
(74) *Attorney, Agent, or Firm*—Kriegsman & Kriegsman (57) ABSTRACT

Compact proton exchange membrane (PEM) electrochemical cell stack. In a preferred embodiment, the cell stack comprises first and second sub-stacks of series-connected, proton exchange membrane (PEM) electrochemical cells. The first sub-stack is stacked between a top end plate and an intermediate plate, and the second sub-stack is stacked between the intermediate plate and a bottom end plate, the top end plate, the intermediate plate and the bottom end plate all extending beyond the peripheries of the first and second sub-stacks. A first set of tie rods is coupled to the top end plate and extends downwardly therefrom through the intermediate plate at points peripheral to the first and second sub-stacks, the first tie rods terminating prior to the bottom end plate. A Belleville washer spring stack is mounted on each of the first tie rods below the intermediate plate and above the bottom end plate for biasing the intermediate plate towards the top end plate. A second set of tie rods is coupled to the bottom end plate and extends upwardly therefrom through the intermediate plate at points peripheral to the first and second sub-stacks, the second tie rods terminating prior to the top end plate. A Belleville washer spring stack is mounted on each of the second tie rods above the intermediate plate and below the top end plate for biasing the intermediate plate towards the bottom end plate. The first and second sub-stacks may be electrically interconnected in series or in parallel.

21 Claims, 7 Drawing Sheets

FIG. 1

PRIOR ART

FIG. 2

PRIOR ART

COMPACT PROTON EXCHANGE MEMBRANE (PEM) ELECTROCHEMICAL CELL STACK

CROSS-REFERENCE TO RELATED APPLICATIONS

The present application claims the benefit under 35 U.S.C. 119(e) of U.S. Provisional Patent Application Ser. No. 60/283,237, filed Apr. 11, 2001, the disclosure of which is incorporated herein by reference.

BACKGROUND OF THE INVENTION

The present invention relates generally to proton exchange membrane (PEM) electrochemical cell stacks and relates more particularly to a novel PEM electrochemical cell stack.

In certain controlled environments, such as those found in airplanes, submarines and spacecrafts, it is often necessary for oxygen to be furnished in order to provide a habitable environment. An electrolysis cell, which uses electricity to convert water to hydrogen and oxygen, represents one type of device capable of producing quantities of oxygen. One common type of electrolysis cell comprises a proton exchange membrane, an anode positioned along one face of the proton exchange membrane, and a cathode positioned along the other face of the proton exchange membrane. To enhance electrolysis, a catalyst, such as platinum, is typically present both at the interface between the anode and the proton exchange membrane and at the interface between the cathode and the proton exchange membrane. The above-described combination of a proton exchange membrane, an anode, a cathode and associated catalysts is commonly referred to in the art as a membrane electrode assembly.

In use, water is delivered to the anode and an electric potential is applied across the two electrodes, thereby causing the electrolyzed water molecules to be converted into protons, electrons and oxygen atoms. The protons migrate through the proton exchange membrane and are reduced at the cathode to form molecular hydrogen. The oxygen atoms do not traverse the proton exchange membrane and, instead, form molecular oxygen at the anode. (An electrolysis cell, when operated in reverse to generate water and electricity using molecular hydrogen and molecular oxygen as starting materials, is referred to in the art as a fuel cell. Electrolysis cells and fuel cells both constitute electrochemical cells, and all discussion herein pertaining to electrolysis cells is correspondingly applicable to fuel cells.)

Often, a number of electrolysis cells are assembled together in order to meet hydrogen or oxygen production requirements. One common type of assembly is a stack comprising a plurality of stacked electrolysis cells that are electrically connected in series in a bipolar configuration. In one common type of stack, each cell includes, in addition to a membrane electrode assembly of the type described above, a pair of multi-layer metal screens, one of said screens being in contact with the outer face of the anode and the other of said screens being in contact with the outer face of the cathode. The screens are used to form the fluid cavities within a cell for the water, hydrogen and oxygen. Each cell additionally includes a pair of polysulfone cell frames, each cell frame peripherally surrounding a screen. The frames are used to peripherally contain the fluids and to conduct the fluids into and out of the screen cavities. Each cell further includes a pair of metal foil separators, one of said separators being positioned against the outer face of the anode screen and the other of said separators being positioned against the outer face of the cathode screen. The separators serve to axially contain the fluids on the active areas of the cell assembly. In addition, the separators and screens together serve to conduct electricity from the anode of one cell to the cathode of its adjacent cell. Plastic gaskets seal the outer faces of the cell frames to the metal separators, the inner faces of the cell frames being sealed to the proton exchange membrane.

Additional information relating to electrolysis cell stacks includes the following patents and publications, all of which are incorporated herein by reference: U.S. Pat. No. 6,057,053, inventor Gibb, issued May 2, 2000; U.S. Pat. No. 5,466,354, inventors Leonida et al., issued Nov. 14, 1995; U.S. Pat. No. 5,366,823, inventors Leonida et al., issued Nov. 22, 1994; U.S. Pat. No. 5,350,496, inventors Smith et al., issued Sep. 27, 1994; U.S. Pat. No. 5,324,565, inventors Leonida et al., issued Jun. 28, 1994; U.S. Pat. No. 5,316,644, inventors Titterington et al., issued May 31, 1994; U.S. Pat. No. 5,009,968, inventors Guthrie et al., issued Apr. 23, 1991; and Coker et al., "Industrial and Government Applications of SPE Fuel Cell and Electrolyzers," presented at The Case Western Symposium on "Membranes and Ionic and Electronic Conducting Polymer," May 17–19, 1982 (Cleveland, Ohio).

In order to ensure optimal conversion of water to hydrogen and oxygen by each electrolysis cell in a stack, there must be uniform current distribution across the active areas of the electrodes of each cell, and there must be a proper sealing of cells to prevent the escape of fluids therefrom. Such uniform current distribution and proper sealing require that uniform contact pressure be applied to the cells while, at the same time, permitting movement of the cell components to compensate for thermal expansion and component creeps. These objectives are typically met by providing an electrically-conductive compression pad between adjacent cells in a stack and by compressing the cells of the stack between a top end plate and a bottom end plate. Compression between the two end plates is typically achieved by mounting both end plates on one or more "tie rods"(i.e., posts), with one or both of said end plates being adapted for sliding movement on said "tie rods," and by mounting springs, typically in the form of Belleville spring washers or the like, on the tie rods external to the end plates in such a way as to bias the end plates towards one another.

Because the amount of spring loading that is required for compression can be quite large in many instances (for example, where operating pressures are in the range of 200 to 6000 psi or where a large number of cells are in a stack), it is common to use stacks of Belleville spring washers on each tie rod, with multiple washers being stacked in parallel to increase load and being stacked in series to increase movement. However, as can readily be appreciated, the stacking of such springs external to the end plates adds to the overall height of the cell stack, a result that may, in some instances, be objectionable.

SUMMARY OF THE INVENTION

It is an object of the present invention to provide a novel PEM electrochemical cell stack.

It is another object of the present invention to provide a novel PEM electrochemical cell stack that overcomes at least some of the shortcomings described above in connection with existing PEM electrochemical cell stacks.

It is still another object of the present invention to provide a PEM electrochemical cell stack that has a compact design.

Therefore, in accordance with the foregoing objects and/or other objects to be described in or to become apparent from the description which follows, there is provided, according to one aspect of the invention, a proton exchange membrane (PEM) electrochemical cell stack comprising (a) a first sub-stack, said first sub-stack comprising a plurality of proton exchange membrane (PEM) electrochemical cells arranged in series in a bipolar configuration; (b) a second sub-stack, said second sub-stack comprising a plurality of proton exchange membrane (PEM) electrochemical cells arranged in series in a bipolar configuration; (c) a top end plate; (d) a bottom end plate; (e) a first intermediate support, said first sub-stack being stacked between said top end plate and said first intermediate support, said second sub-stack being stacked between said first intermediate support and said bottom end plate; (f) wherein said top end plate, said first intermediate support and said bottom end plate all extend beyond the peripheries of said first and second sub-stacks; (g) a first tie rod, said first tie rod being coupled to said top end plate and extending downwardly from said top end plate through said first intermediate support at a point peripheral to both of said first and second sub-stacks, said first tie rod terminating prior to said bottom end plate; and (h) first biasing means, mounted on said first tie rod below said first intermediate support and above said bottom end plate, for biasing said first intermediate support towards said top end plate.

The aforementioned intermediate support may be either a plate or an annular support. Where the intermediate support is a plate, electrical insulation is preferably additionally provided to electrically isolate the plate from the tie rods and/or biasing means. Such insulation may not be necessary for an annular support where the annular support does not extend radially inward to where the support is in contact with the electrically-conductive components of the sub-stack.

In a preferred embodiment, the electrochemical cell stack of the present invention comprises first and second sub-stacks of series-connected, proton exchange membrane (PEM) electrochemical cells. The first sub-stack is stacked between a top end plate and an intermediate plate, and the second sub-stack is stacked between the intermediate plate and a bottom end plate, the top end plate, the intermediate plate and the bottom end plate all extending beyond the peripheries of the first and second sub-stacks. A first set of tie rods is coupled to the top end plate and extends downwardly therefrom through the intermediate plate at points peripheral to the first and second sub-stacks, the first tie rods terminating prior to the bottom end plate. A Belleville washer spring stack is mounted on each of the first tie rods below the intermediate plate and above the bottom end plate for biasing the intermediate plate towards the top end plate. A second set of tie rods is coupled to the bottom end plate and extends upwardly therefrom through the intermediate plate at points peripheral to the first and second sub-stacks, the second tie rods terminating prior to the top end plate. A Belleville washer spring stack is mounted on each of the second tie rods above the intermediate plate and below the top end plate for biasing the intermediate plate towards the bottom end plate. The first and second sets of tie rods are preferably interlaced in an alternating pattern around the entire periphery of the sub-stacks.

As can readily be appreciated, because, in the electrochemical cell stack of the present invention, the Belleville spring washer stacks are positioned between the top and bottom end plates, the overall size of the cell stack is kept to a minimum. This is a considerable advantage over comparable existing cell stacks.

In addition, another particularly advantageous feature of the PEM electrochemical cell stack of the present invention is that the sub-stacks thereof can be electrically interconnected either in series or in parallel. By connecting the sub-stacks in parallel, the current capacity of the stack can be substantially increased while using a single set of end plates and the same compression hardware. Moreover, the current capacity can be further increased by introducing additional intermediate supports into the cell stack.

Additional objects, features, aspects and advantages of the present invention will be set forth, in part, in the description which follows and, in part, will be obvious from the description or may be learned by practice of the invention. In the description, reference is made to the accompanying drawings which form a part thereof and in which is shown by way of illustration specific embodiments for practicing the invention. These embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate preferred embodiments of the invention and, together with the description, serve to explain the principles of the invention. In the drawings wherein like reference numerals represent like parts.

DETAILED DESCRIPTION OF PREFERRED EMBODIMENTS

Figure 1:
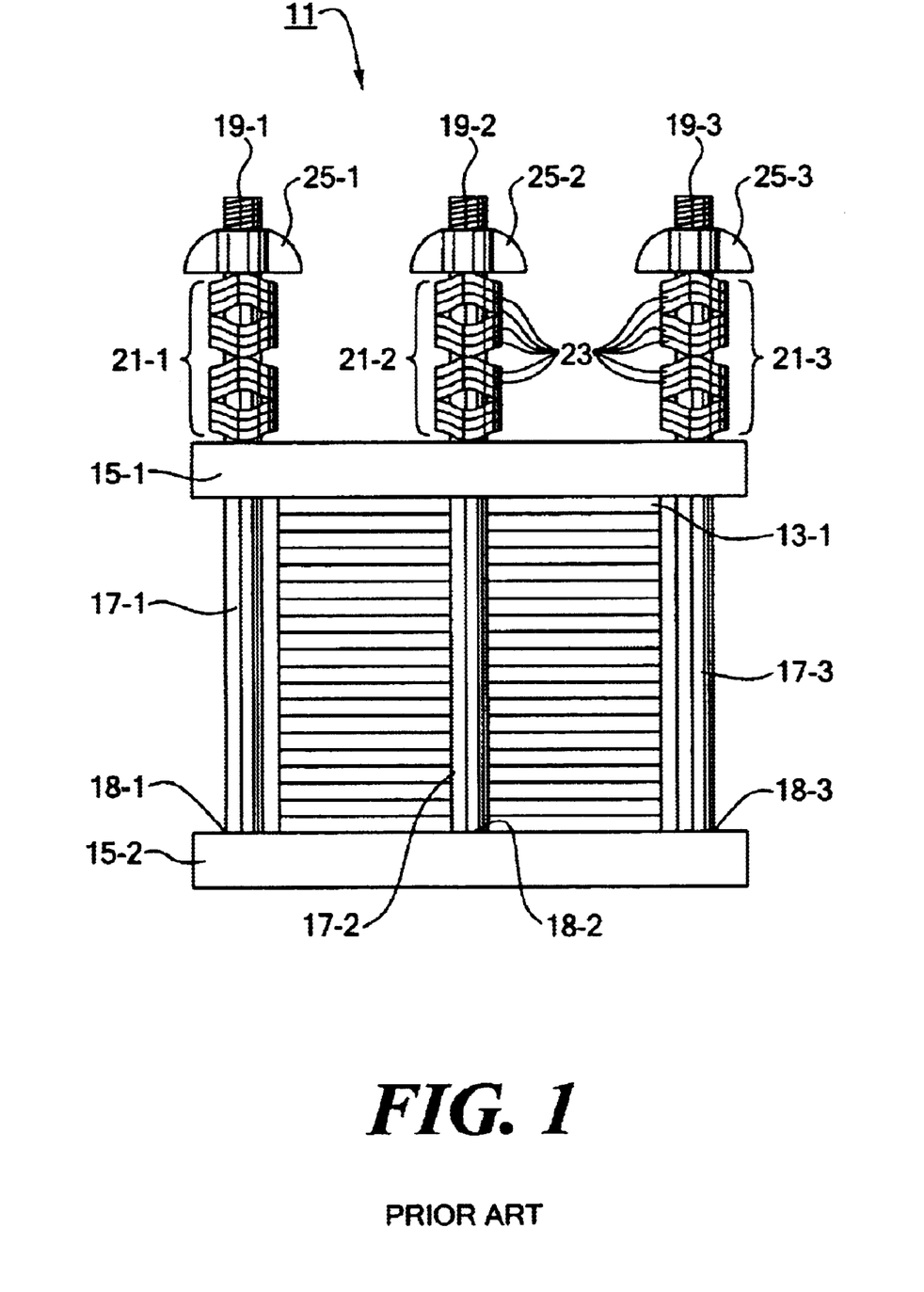
FIG. 1 is a simplified schematic front view of a first type of conventional PEM electrochemical cell stack.

Referring now to FIG. 1, there is shown a simplified schematic front view of a first type of conventional PEM electrochemical cell stack, said first type of conventional PEM electrochemical cell stack being represented generally by reference numeral 11. (For simplicity and clarity, certain components of stack 11, such as electrical cables external electrical connections and ports for admitting water and for releasing hydrogen gas and oxygen gas, are not shown or further described herein.)

Stack 11 comprises a plurality of identical PEM electrochemical cells 13-1 through 13-20, cells 13-1 through 13-20 being arranged in series in a bipolar configuration. For simplicity and clarity, the details of cells 13-1 through 13-20, which are well-known and are described above, are not shown in FIG. 1 and are not further described herein. In addition, conventional electrically-conductive compression pads, one of which is positioned in the conventional manner between each adjacent pair of PEM electrochemical cells 13, are not shown in FIG. 1 and are not further described herein.

Stack 11 also comprises a top end plate 15-1 and a bottom end plate 15-2, cells 13-1 through 13-20 being sandwiched between top end plate 15-1 and bottom end plate 15-2. For reasons to become apparent below, end plates 15-1 and 15-2 are sized to extend beyond the peripheries of cells 13-1 through 13-20.

Stack 11 additionally comprises a plurality of tie rods 17-1 through 17-3, tie rods 17-1 through 17-3 extending perpendicularly relative to end plates 15-1 and 15-2 at points located around the peripheries of cells 13-1 through 13-20. The bottom ends 18-1 through 18-3 of tie rods 17-1 through 17-3, respectively, are fixed to bottom end plate 15-2, and the top ends 19-1 through 19-3 of tie rods 17-1 through 17-3, respectively, extend through transverse openings (not shown) provided in top end plate 15-1. For reasons to be discussed below, top ends 19-1 through 19-3 of tie rods 17-1 through 17-3, respectively, are externally threaded.

Stack 11 further comprises a plurality of Belleville washer spring stacks 21-1 through 21-3, stacks 21-1 through 21-3 being inserted over tie rods 17-1 through 17-3, respectively, and positioned against the top of end plate 15-1. Each Belleville washer spring stack 21 comprises a plurality of Belleville washer springs 23 arranged in alternating upwardly-facing and downwardly-facing groups.

Stack 11 additionally comprises a plurality of annular caps 25-1 through 25-3, caps 25-1 through 25-3 being internally threaded and appropriately dimensioned to permit their being screwed over the top ends 19-1 through 19-3 of rods 17-1 through 17-3, respectively. In this manner, by controllably tightening caps 25-1 through 25-3 against stacks 21-1 through 21-3, respectively, the compressive force applied to end plate 15-1 in the direction of end plate 15-2 can be adjusted.

Unfortunately, however, as can be seen in FIG. 1, there is considerable height added to stack 11 by Belleville washer spring stacks 21-1 through 21-3, caps 25-1 through 25-3 and the top portions of rods 17-1 through 17-3.

Figure 2:
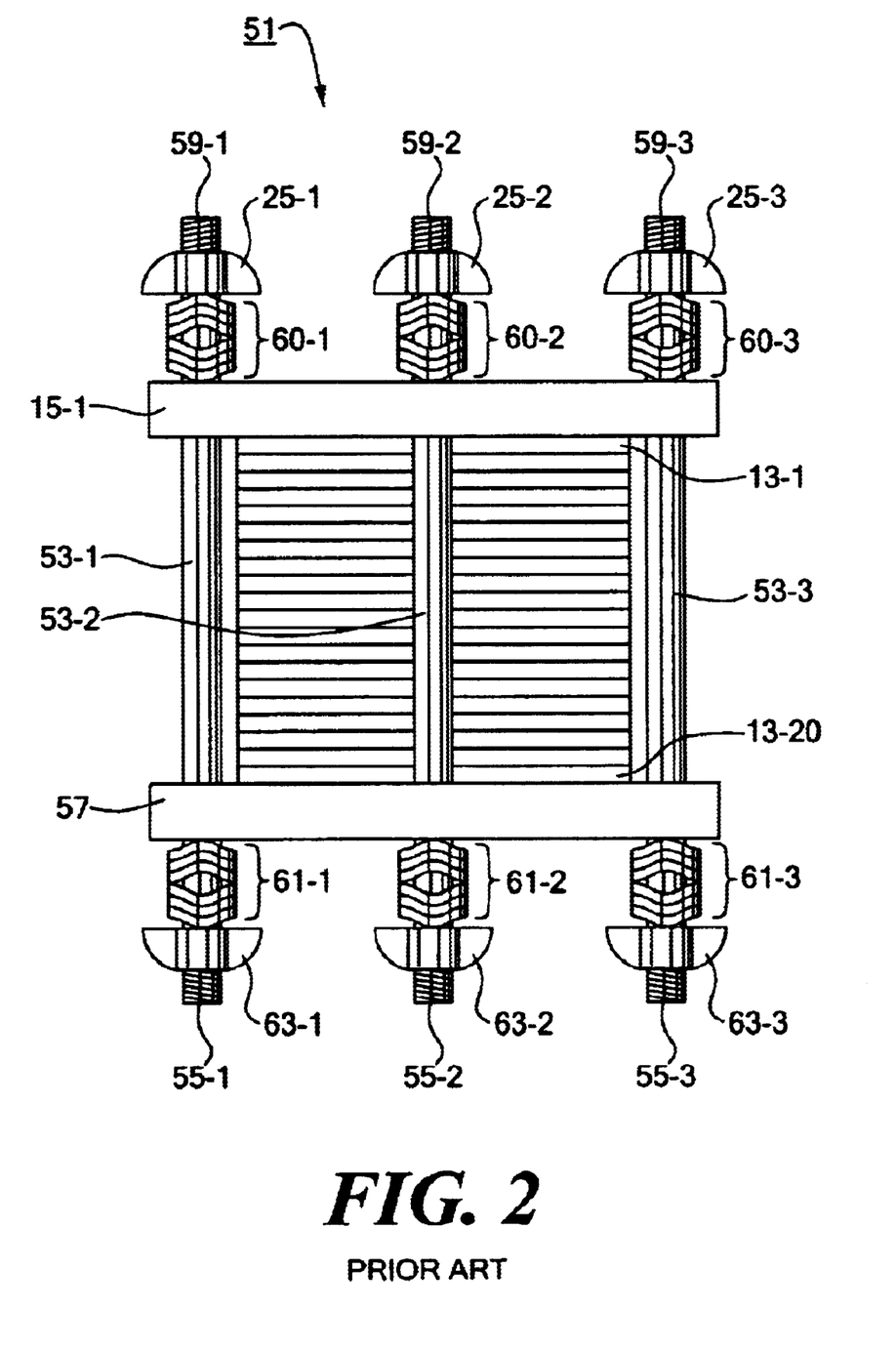
FIG. 2 is a simplified schematic front view of a second type of conventional PEM electrochemical cell stack.

Referring now to FIG. 2, there is shown a simplified schematic front view of a second type of conventional PEM electrochemical cell stack, said second type of conventional PEM electrochemical cell stack being represented generally by reference numeral 51. (For simplicity and clarity, certain components of stack 51, such as electrical cables for external electrical connections and ports for admitting water and for releasing hydrogen gas and oxygen gas, are not shown or further described herein.)

Stack 51 is similar in many respects to stack 11. One of the principal differences between the two stacks is that, in stack 11, rods 17-1 through 17-3 are fixed to bottom plate 15-2 whereas, in stack 51, there are provided rods 53-1 through 53-3 having externally threaded bottom ends 55-1 through 55-3, respectively, that extend downwardly through transverse openings (not shown) in a bottom end plate 57. Another principal difference between the two stacks is that stack 51 includes, in addition to Belleville washer spring stacks 60-1 through 60-3 (stacks 60-1 through 60-3 being half as big as stacks 21-1 through 21-3) and caps 25-1 through 25-3 mounted over the externally threaded top ends 59-1 through 59-3 of rods 53-1 through 53-3, respectively, Belleville washer spring stacks 61-1 through 61-3 and caps 63-1 through 63-3 mounted over bottom ends 55-1 through 55-3, respectively. In this manner, by controllably tightening caps 25-1 through 25-3 against stacks 60-1 through 60-3, respectively, the compressive force applied to end plate 15-1 in the direction of end plate 57 can be adjusted, and by controllably tightening caps 63-1 through 63-3 against stacks 61-1 through 61-3, respectively, the compressive force applied to end plate 57 in the direction of end plate 15-1 can be adjusted.

However, as can readily be appreciated, the problem of space consumption described above in connection with stack 11 is no better in the case of stack 51.

Figure 3:
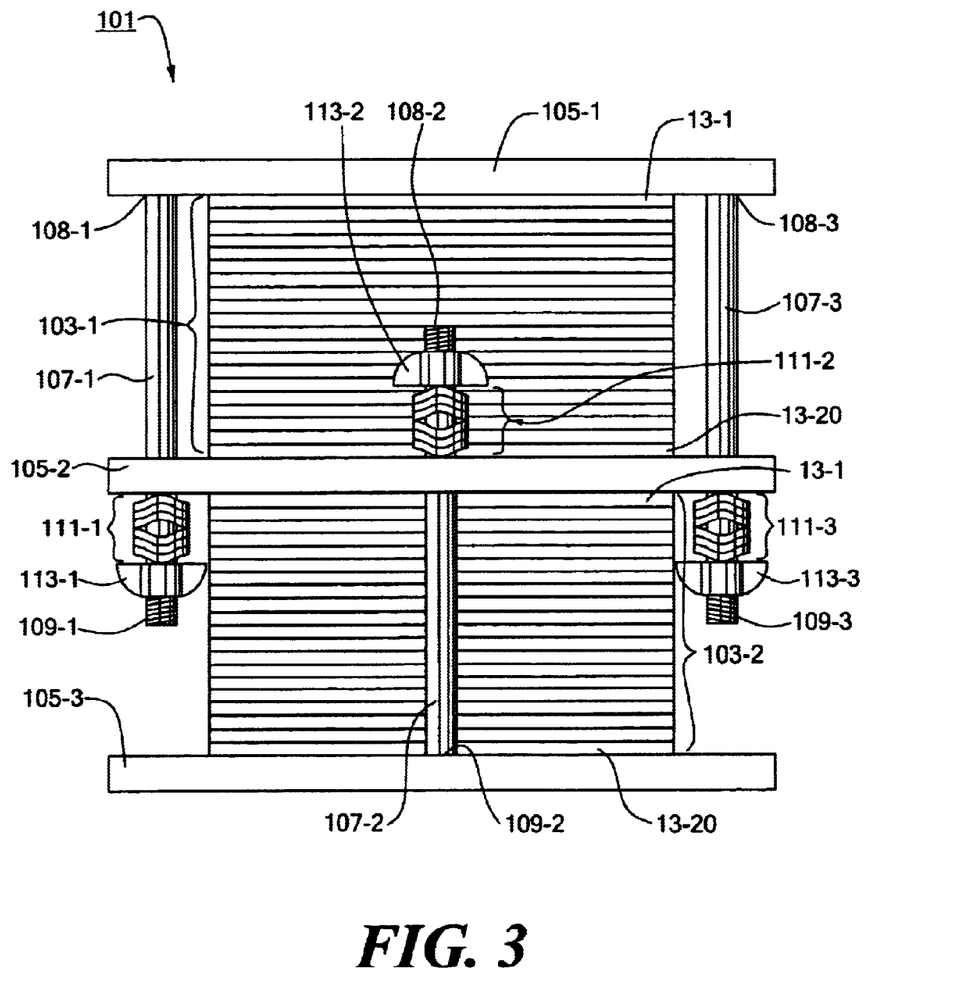
FIG. 3 is a simplified schematic front view of a first embodiment of a PEM electrochemical cell stack constructed according to the teachings of the present invention.

Referring now to FIG. 3, there is shown a simplified schematic front view of a first embodiment of a PEM electrochemical cell stack constructed according to the teachings of the present invention, said PEM electrochemical cell stack being represented generally by reference numeral 101. (For simplicity and clarity, certain components of stack 101, such as electrical cables for external electrical connections and ports for admitting water and for releasing hydrogen gas and oxygen gas, are not shown or further described herein.)

Stack 101 comprises a first sub-stack 103-1 of identical PEM electrochemical cells 13-1 through 13-20 and a second sub-stack 103-2 of identical PEM electrochemical cells 13-1 through 13-20, cells 13-1 through 13-20 being arranged in each of sub-stacks 103-1 and 103-2 in series in a bipolar configuration. For simplicity and clarity, the details of cells 13-1 through 13-20, which are well-known and are described above, are not shown in FIG. 3 and are not further described herein (it being understood, however, that cells 13-1 through 13-20 are not limited to that which is disclosed herein and may encompass any type of PEM electrochemical cell). In addition, conventional electrically-conductive compression pads, one of which is positioned in the conventional manner between each adjacent pair of PEM electrochemical cells 13 within a sub-stack 103, are not shown in FIG. 3 and are not further described herein (it being understood, however, that stack 101 may include, instead of conventional electrically-conductive compression pads, electrically-conductive compression pads of the type described in commonly-assigned U.S. patent application Ser. Nos. 09/747,423, now U.S. Pat. No. 6,969,846, and 09/827,368, now U.S. Pat. No. 6,500,319, both of which are incorporated herein by reference).

Stack 101 also comprises a top end plate 105-1, an intermediate plate 105-2 and a bottom end plate 105-3, first sub-stack 103-1 being sandwiched between top end plate 105-1 and intermediate plate 105-2, second sub-stack 103-2 being sandwiched between intermediate plate 105-2 and bottom end plate 105-3. For reasons to become apparent below, plates 105-1 through 105-3 are sized to extend beyond the peripheries of sub-stacks 103-1 through 103-2. For reasons also to become apparent below, intermediate plate 105-2 is preferably made of a relatively stiff material to resist bending.

Stack 101 additionally comprises a plurality of tie rods 107-1 through 107-3, tie rods 107-1 through 107-3 extending perpendicularly relative to plates 105-1 through 105-3 at points located around the peripheries of sub-stacks 103-1 and 103-2. The top ends 108-1 and,108-3 of tie rods 107-1 and 107-3, respectively, are fixed to top end plate 105-1, and the bottom ends 109-1 and 109-3 of tie rods 107-1 and 107-3, respectively, extend through transverse openings (not shown) provided in intermediate plate 105-2, terminating a short distance above bottom plate 105-3. The bottom end 109-2 of tie rod 107-2 is fixed to bottom end plate 105-3, and the top end 108-2 of tie rod 107-2 extends through a transverse opening (not shown) provided in intermediate plate 105-2, terminating a short distance below top plate 105-1. For reasons to be discussed below, the bottom ends 109-1 and 109-3 of tie rods 107-1 and 107-3, respectively, and the top end 108-2 of tie rod 107-2 are externally threaded.

Stack 101 further comprises a plurality of Belleville washer spring stacks 111-1 through 111-3, stacks 111-1 through 111-3 being identical to Belleville washer spring stacks 60-1 through 60-3, respectively. Stacks 111-1 and 111-3 are inserted over bottom ends 109-1 and 109-3 of tie rods 107-1 and 107-3, respectively, and are positioned against the bottom of intermediate plate 105-2. Stack 111-2 is inserted over top end 108 of tie rod 107-2 and is positioned against the top of intermediate plate 105-2.

Although not shown, stack 101 preferably also includes insulating material to electrically isolate intermediate plate 105-2 from tie rods 107-1 through 107-3 and stacks 111-1 through 111-3.

Stack 101 additionally comprises a plurality of annular caps 113-1 through 113-3, caps 113-1 through 113-3 being internally threaded and appropriately dimensioned to permit their being screwed over bottom end 108-1, top end 109-2 and bottom end 108-3 of rods 107-1 through 107-3, respectively. Consequently, as can be seen, by controllably tightening caps 113-1 and 113-3 against stacks 111-1 and 111-3, respectively, the compressive force applied to intermediate plate 105-2 in the direction of top end plate 105-1 can be adjusted, and by controllably tightening cap 113-2 against stack 111-2, the compressive force applied to intermediate plate 105-2 in the direction of bottom plate 105-3 can be adjusted.

As can be seen, because stack 101 does not have tie rods extending beyond top end plate 105-1 and/or bottom end plate 105-3, stack 101 has a more compact design than either stack 11 or stack 51 (with stack 101 undergoing only a slight increase in end plate diameter to accommodate the positioning of the spring stacks around the peripheries of the cells).

It should be understood that, primarily for the sake of clarity, stack 101 has been described as having only three tie rods 107-1 through 107-3; however, notwithstanding the above, stack 101 could readily be modified to have a different number of tie rods. For example, stack 101 could readily be modified so as to include a considerably larger number of tie rods, with the tie rods arranged so as to alternately emanate from top end plate 105-1 and bottom end plate 105-3. In fact, one could size the tie rods and spring stacks to provide twice as many tie rods with one-half the number of springs on each than is the case with stack 11. Such an arrangement would be a volume efficient method of sealing a stack for high-pressure operation (200 to 6000 psi).

It should also be noted that one of the advantages of the design of stack 101, as compared to stack 11 or stack 51, is that stack 101 can be used to connect sub-stacks 103-1 and 103-2 either in series or in parallel since end plates 105-1 through 105-3 also serve as terminal plates. One significant benefit to connecting sub-stacks 103-1 and 103-2 in parallel is that the current capacity of stack 101 can be substantially increased (i.e., doubled). This is useful in those instances in which system requirements dictate the usage of very large currents but increasing cell size is impractical. Current capacity can be even further increased (tripled or more) by providing additional intermediate plates in stack 101.

Figure 4:
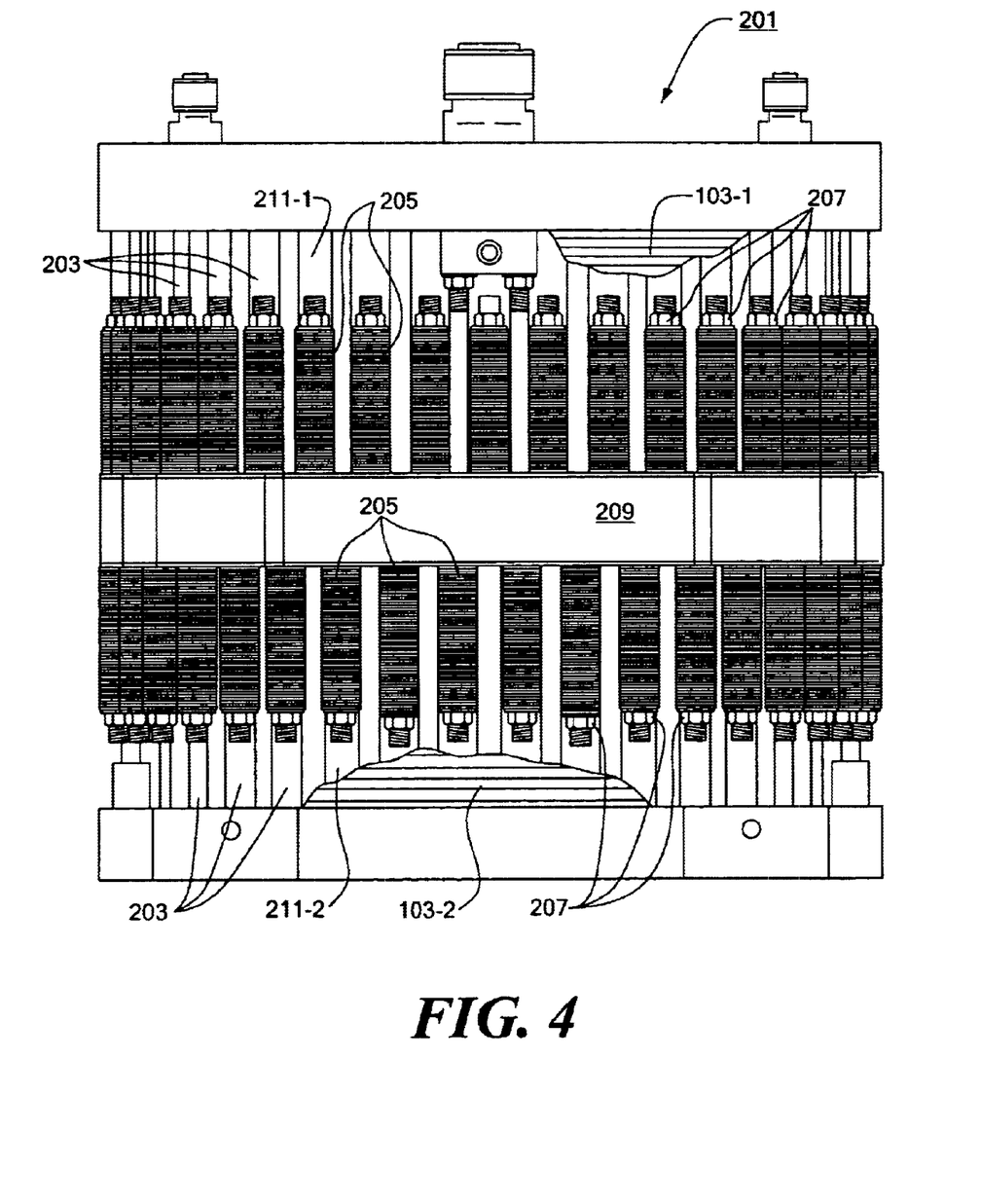
FIG. 4 is a front view, broken away in part, of a second embodiment of a PEM electrochemical cell stack constructed according to the teachings of the present invention.

Referring now to FIG. 4, there is shown a front view, broken away in part, of a second embodiment of a PEM electrochemical cell stack constructed according to the teachings of the present invention, said PEM electrochemical stack being represented generally by reference numeral 201. (For simplicity and clarity, certain components of stack 101, such as electrical cables for external electrical connections, are not shown or further described herein.)

Stack 201 is similar in many respects to stack 101, the principal differences between the two units being that (1) stack 201 includes a significantly greater number of tie rods 203, Belleville washer spring stacks 205 and caps 207 than the three tie rods 107, three stacks 111 and three caps 113 of stack 101; (2) intermediate plate 105-2 of stack 101 is replaced with an annular support 209 in stack 201, annular support 209 being dimensioned so as not to extend radially inwardly into contact with the electrically-sensitive components of sub-stacks 103-1 and 103-2; and (3) stack 201 additionally includes a pair of reinforcing cylinders 211-1 and 211-2, cylinder 211-1 peripherally surrounding sub-stack 103-1, cylinder 211-2 peripherally surrounding sub-stack 103-2. (Reinforcing cylinder 211 may be of the type disclosed in commonly-assigned U.S. patent application Ser. No. 10/023,428, the disclosure of which is incorporated herein by reference.)

Like stack 101, stack 201 may be operated with its sub-stacks 103-1 and 103-2 electrically connected in series or in parallel.

Figure 5:
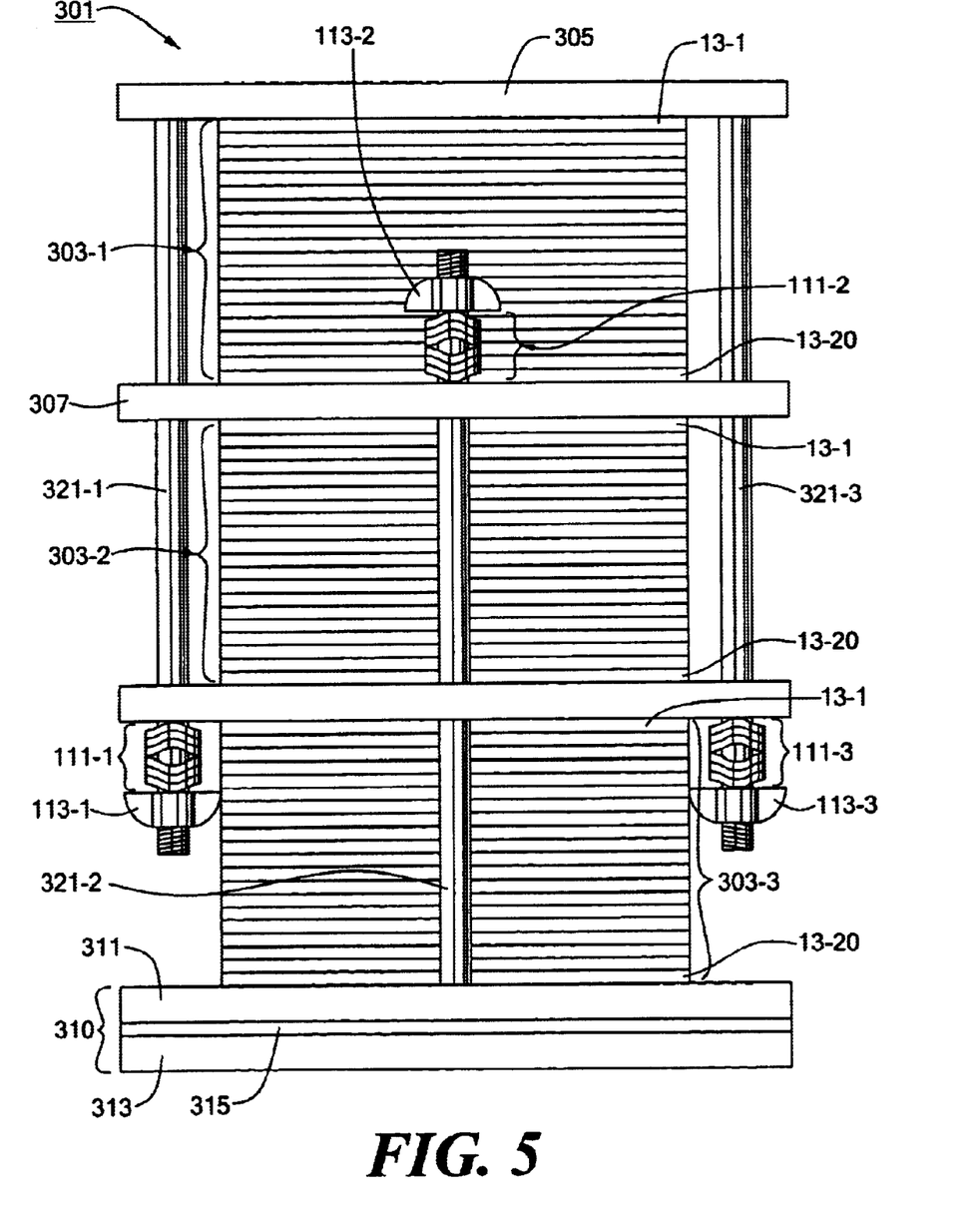
FIG. 5 is a simplified schematic front view of a third embodiment of a PEM electrochemical cell stack constructed according to the teachings of the present invention.

Referring now to FIG. 5, there is shown a simplified schematic front view of a third embodiment of a PEM electrochemical cell stack constructed according to the teachings of the present invention, said PEM electrochemical cell stack being represented generally by reference numeral 301. (For simplicity and clarity, certain components of stack 301, such as electrical cables for external electrical connections and ports for admitting water and for releasing hydrogen gas and oxygen gas, are not shown or further described herein.)

Stack 301 is similar in many respects to stack 101, the principal differences between the two stacks being that (1) whereas stack 101 includes two sub-stacks 103-1 and 103-2, stack 301 includes three sub-stacks 303-1 through 303-3, each sub-stack 303 comprising a plurality of cells 13-1 through 13-20; (2) whereas stack 101 includes a pair of end plates 105-1 and 105-3 and an intermediate plate 105-2, stack 301 includes a top end plate 305, a first intermediate plate 307, sub-stack 303-1 being sandwiched between top end plate 305 and first intermediate plate 307, a second intermediate plate 309, sub-stack 303-2 being sandwiched between first intermediate plate 307 and second intermediate plate 309, a bottom end plate assembly 310, sub-stack 303-3 being sandwiched between second intermediate layer 309 and bottom end plate assembly 310, assembly 310 comprising a plate 311, a plate 313 and a layer of insulation 315 sandwiched between plate 311 and plate 313; and (3) whereas each of tie rods 107-1 through 107-3 of stack 101 passes through one intermediate plate 105-2, each of tie rods 321-1 through 321-3 passes through a pair of intermediate plates in stack 301.

It should be noted that, by operating stack 301 so that each of top end plate 305 and intermediate plate 309 serves as a negative terminal and so that each of intermediate plate 307 and plate 311 serves as a positive terminal, the current in plates 307 and 309 will be twice that in plates 305 and 311.

Figure 6:
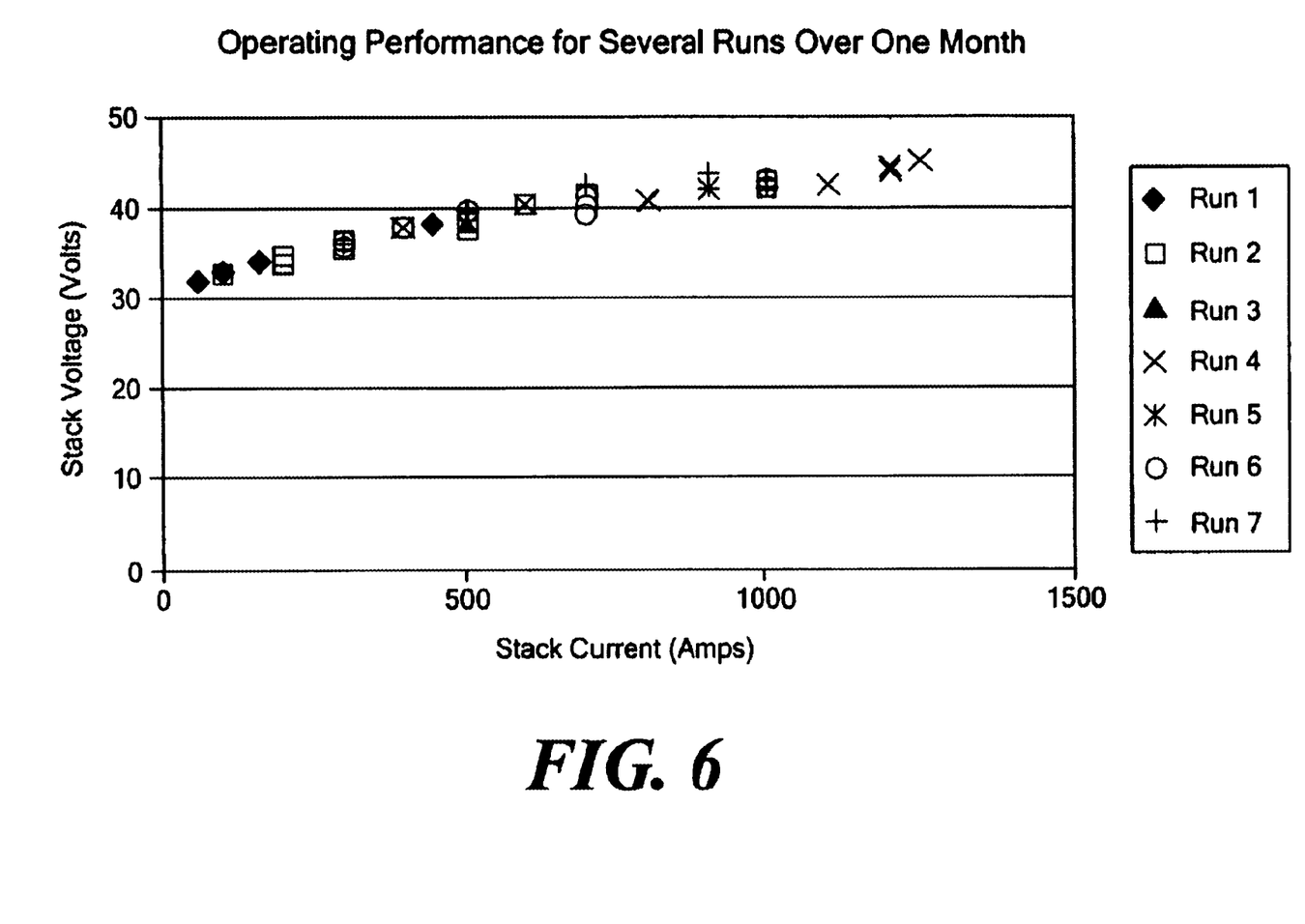
FIG. 6 is a fragmentary simplified schematic front view of a fourth embodiment of a PEM electrochemical cell stack constructed according to the teachings of the present invention.

Referring now to FIG. 6, there is shown a fragmentary simplified schematic front view of a fourth embodiment of a PEM electrochemical cell stack constructed according to the teachings of the present invention, said PEM electrochemical cell stack being represented generally by reference numeral 401.

Stack 401 is similar in certain respects to stack 51, the principal differences between the two stacks being that stack 401 includes two sub-stacks of cells 13-1 through 13-20, said two sub-stacks being separated by an intermediate plate 403 having transverse openings (not shown) through which tie rods 53-1 through 53-3 extend.

The two sub-stacks of stack 401 may be electrically connected either in series or in parallel. (Parallel connection affording stack 401 increased current capacity.) Accordingly, where the size of a stack is not critical, stack 401 may be used as an alternative to stack 101.

It should also be noted that, in all of the stacks of the present invention, the electrolysis fluids both input and output may flow through internal porting in either series or parallel flow, independently of the external parallel electrical connections.

The following example is provided for illustrative purposes only and is in no way intended to limit the scope of the present invention:

EXAMPLE 1

Figure 7:
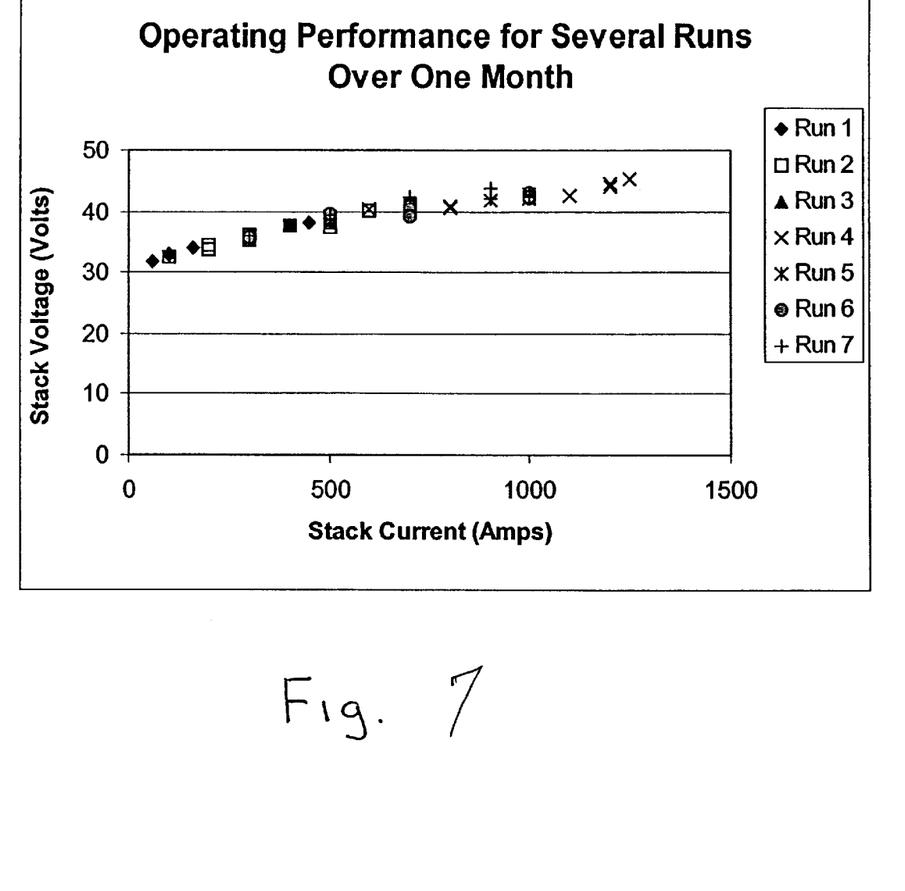
FIG. 7 is a graph depicting the operating performance for several runs over one month of the PEM electrochemical cell stack shown in FIG. 4.

An electrolysis unit having the same general construction of stack 201 was operated with its two 20-cell, series-connected, bipolar stacks connected electrically in parallel (i.e., central plate positive, top and bottom plates negative). The average ionic resistance of the 0.3-ft$^2$ active area cells was 1 milliohm per cell. There was no cell shorting and the stack sealed internally and externally to pressures of 900 psi. Also, the cells were leak-tight at a differential pressure of 900 psi across the membrane and electrode assemblies. The electrolysis unit was subsequently operated at a temperature of 120 to 130° F. for over 200 hours at current densities of 0 to 2000 A/ft$^2$. The average cell voltage was 2.1 V/cell at 1000 A/ft$^2$. The operating performance of the unit is shown in FIG. 7. Even though the unit has a maximum current capacity of 600 amps per cell, when the unit was operated with its two stacks in parallel, the unit was able to handle 1200 amps, as 1200 amps were fed to the center plate and 600 amps were fed out of each of the two negative plates.

The embodiments of the present invention recited herein are intended to be merely exemplary and those skilled in the art will be able to make numerous variations and modifications to it without departing from the spirit of the present invention. All such variations and modifications are intended to be within the scope of the present invention as defined by the claims appended hereto.

What is claimed is:

1. An electrochemical cell stack comprising:
   (a) a first sub-stack, said first sub-stack comprising a plurality of proton exchange membrane (PEM) electrochemical cells arranged in series in a bipolar configuration;
   (b) a second sub-stack, said second sub-stack comprising a plurality of proton exchange membrane (PEM) electrochemical cells arranged in series in a bipolar configuration;
   (c) a top end plate;
   (d) a bottom end plate;
   (e) a first intermediate support, said first sub-stack being stacked,between said top end plate and said first intermediate support, said second sub-stack being stacked between said first intermediate support and said bottom end plate;
   (f) wherein said top end plate, said first intermediate support and said bottom end plate all extend beyond the peripheries of said first and second sub-stacks;
   (g) a first tie rod, said first tie rod being coupled to said top end plate and extending downwardly from said top end plate through said first intermediate support at a point peripheral to both of said first and second sub-stacks, said first tie rod terminating prior to said bottom end plate; and
   (h) first biasing means, mounted on said first tie rod below said first intermediate support and above said bottom end plate, for biasing said first intermediate support towards said top end plate.

2. The electrochemical cell stack as claimed in claim 1 wherein said first intermediate support is a plate.

3. The electrochemical cell stack as claimed in claim 1 wherein said first intermediate support is an annular support.

4. The electrochemical cell stack as claimed in claim 1 wherein said first biasing means comprises a stack of Belleville washer springs mounted onto said first tie rod.

5. The electrochemical cell stack as claimed in claim 1 wherein said first tie rod has a top end fixed to said top end plate.

6. The electrochemical cell stack as claimed in claim 1 further comprising a second tie rod, said second tie rod being coupled to said bottom end plate and extending upwardly from said bottom end plate through said first intermediate support at a point peripheral to both of said first and second sub-stacks, said second tie rod terminating prior to said top end plate, and second biasing means, mounted on said second tie rod above said first intermediate support and below said top end plate, for biasing said first intermediate support towards said bottom end plate.

7. The electrochemical cell stack as claimed in claim 6 wherein said second biasing means comprises a stack of Belleville washer springs mounted onto said second tie rod.

8. The electrochemical cell stack as claimed in claim 6 wherein said second tie rod has a bottom end fixed to said bottom end plate.

9. The electrochemical cell stack as claimed in claim 1 wherein said first sub-stack and said second sub-stack are electrically connected in series.

10. The electrochemical cell stack as claimed in claim 1 wherein said first sub-stack and said second sub-stack are electrically connected in parallel.

11. The electrochemical cell stack as claimed in claim 1 further comprising a third sub-stack, said third sub-stack comprising a plurality of proton exchange membrane (PEM) electrochemical cells arranged in series in a bipolar configuration, and further comprising a second intermediate support, said second sub-stack being stacked between said first intermediate support and said second intermediate support, said third sub-stack being stacked between said second intermediate support and said bottom end plate, said second intermediate support extending beyond the peripheries of each of said first, second and third sub-stacks, and wherein said first tie rod extends downwardly from said top end plate through both of said first and second intermediate supports at a point peripheral to all of said first, second and third sub-stacks, said first tie rod terminating prior to said bottom end plate and wherein said first biasing means is mounted on said first tie rod below said second intermediate support and above said bottom end plate.

12. The electrochemical cell stack as claimed in claim 11 further comprising a second tie rod, said second tie rod being coupled to said bottom end plate and extending upwardly from said bottom end plate through said second intermediate support and said first intermediate support at a point peripheral to all of said first, second and third sub-stacks, said second tie rod terminating prior to said top end plate, and second biasing means, mounted on said second tie rod above said first intermediate support and below said top end plate, for biasing said first intermediate support towards said bottom end plate.

13. An electrochemical cell stack comprising:
   (a) a first sub-stack, said first sub-stack comprising a plurality of proton exchange membrane (PEM) electrochemical cells arranged in series in a bipolar configuration;
   (b) a second sub-stack, said second sub-stack comprising a plurality of proton exchange membrane (PEM) electrochemical cells arranged in series in a bipolar configuration;
   (c) a top end plate;
   (d) a bottom end plate;
   (e) a first intermediate support, said first sub-stack being stacked between said top end plate and said first intermediate support, said second sub-stack being stacked between said first intermediate support and said bottom end plate;
   (f) wherein said top end plate, said first intermediate support and said bottom end plate all extend beyond the peripheries of said first and second sub-stacks;
   (g) a first tie rod, said first tie rod being coupled to said bottom end plate and extending upwardly from said bottom end plate through said first intermediate support at a point peripheral to both of said first and second sub-stacks, said first tie rod terminating prior to said top end plate; and
   (h) first biasing means, mounted on said first tie rod above said first intermediate support and below said top end plate, for biasing said first intermediate support towards said bottom end plate.

14. The electrochemical cell stack as claimed in claim 13 wherein said intermediate support is a plate.

15. The electrochemical cell stack as claimed in claim 13 wherein said intermediate support is an annular support.

16. The electrochemical cell stack as claimed in claim 13 wherein said first sub-stack and said second sub-stack are electrically connected in series.

17. The electrochemical cell stack as claimed in claim 13 wherein said first sub-stack and said second sub-stack are electrically connected in parallel.

18. An electrochemical cell stack comprising:
   (a) a first sub-stack, said first sub-stack comprising a plurality of proton exchange membrane (PEM) electrochemical cells arranged in series in a bipolar configuration;
   (b) a second sub-stack, said second sub-stack comprising a plurality of proton exchange membrane (PEM) electrochemical cells arranged in series in a bipolar configuration;
   (c) a top end plate;
   (d) a bottom end plate;
   (e) a first intermediate support, said first sub-stack being stacked between said top end plate and said first intermediate support, said second sub-stack being stacked between said first intermediate support and said bottom end plate;
   (f) wherein said top end plate, said first intermediate support and said bottom end plate all extend beyond the peripheries of said first and second sub-stacks;
   (g) a first plurality of tie rods, each of said first plurality of tie rods being coupled to said top end plate and extending downwardly from said top end plate through said first intermediate support at a point peripheral to both of said first and second sub-stacks, said first plurality of tie rods terminating prior to said bottom end plate;
   (h) biasing means, mounted on said first plurality of tie rods below said first intermediate support and above said bottom end plate, for biasing said first intermediate support towards said top end plate;
   (i) a second plurality of tie rods, each of said second plurality of tie rods being coupled to said bottom end plate and extending upwardly from said bottom end plate through said first intermediate support at a point peripheral to both of said first and second sub-stacks, said second plurality of tie rods terminating prior to said top end plate; and
   (j) biasing means, mounted on said second plurality of tie rods above said first intermediate support and below said top end plate, for biasing said first intermediate support towards said bottom end plate.

19. The electrochemical cell stack as claimed in claim 18 wherein each of said first and second pluralities of tie rods is evenly spaced around the peripheries of said first and second sub-stacks and wherein said first and second pluralities of tie rods are interlaced in an alternating pattern.

20. The electrochemical cell stack as claimed in claim 18 wherein said first and second sub-stacks are electrically connected in parallel.

21. An electrochemical cell stack comprising:
   (a) a first sub-stack, said first sub-stack comprising a plurality of proton exchange membrane (PEM) electrochemical cells arranged in series in a bipolar configuration;
   (b) a second sub-stack, said second sub-stack comprising a plurality of proton exchange membrane (PEM) electrochemical cells arranged in series in a bipolar configuration;
   (c) a top end plate;
   (d) a bottom end plate;
   (e) a first intermediate support, said first sub-stack being stacked between said top end plate and said first intermediate support, said second sub-stack being stacked between said first intermediate support and said bottom end plate;
   (f) means for biasing said top end plate towards said first intermediate support; and
   (g) means for biasing said bottom end plate towards said first intermediate support;
   (h) wherein said first and second sub-stacks are electrically connected in parallel.

* * * * *